(12) United States Patent
Beall et al.

(10) Patent No.: US 11,390,558 B2
(45) Date of Patent: Jul. 19, 2022

(54) COLORED GLASS-CERAMICS HAVING PETALITE AND LITHIUM SILICATE STRUCTURES

(71) Applicant: CORNING INCORPORATED, Corning, NY (US)

(72) Inventors: George Halsey Beall, Big Flats, NY (US); Qiang Fu, Painted Post, NY (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/884,825

(22) Filed: May 27, 2020

(65) Prior Publication Data

US 2020/0377404 A1    Dec. 3, 2020

Related U.S. Application Data

(60) Provisional application No. 62/853,953, filed on May 29, 2019.

(51) Int. Cl.
　　*C03C 10/00*　　(2006.01)
　　*C03C 1/04*　　(2006.01)
　　*C03C 4/02*　　(2006.01)

(52) U.S. Cl.
　　CPC .............. *C03C 10/0027* (2013.01); *C03C 1/04* (2013.01); *C03C 4/02* (2013.01); *C03C 2204/00* (2013.01)

(58) Field of Classification Search
　　CPC ......... C03C 2204/00; C03C 4/02; C03C 1/04; C03C 10/0027
　　See application file for complete search history.

(56) References Cited

U.S. PATENT DOCUMENTS 3,681,097 A　　8/1972　Beall et al.
5,070,044 A　　12/1991　Pinckney
(Continued)

FOREIGN PATENT DOCUMENTS

| CN | 104445867 A | 3/2015 |
| JP | 2001126236 A | 5/2001 |
| WO | 2012/143137 A1 | 10/2012 |
| WO | 2016/057748 A1 | 4/2016 |

OTHER PUBLICATIONS

Beall et al; "Nanophase Glass-Ceramics"; J. Am. Ceram. Soc., 1999, 82: 5-16.
(Continued)

*Primary Examiner* — Karl E Group
*Assistant Examiner* — Cameron K Miller

(57) ABSTRACT

A glass-ceramic article comprises a petalite crystalline phase and a lithium silicate crystalline phase. The weight percentage of each of the petalite crystalline phase and the lithium silicate crystalline phase in the glass-ceramic article are greater than each of the weight percentages of other crystalline phases present in the glass-ceramic article. The glass-ceramic article has a transmittance color coordinate in the CIELAB color space of: $L^*$=from 20 to 90; $a^*$=from −20 to 40; and $b^*$=from −60 to 60 for a CIE illuminant F02 under SCI UVC conditions. In some embodiments, the colorant is selected from the group consisting of $TiO_2$, $Fe_2O_3$, NiO, $Co_3O_4$, $MnO_2$, $Cr_2O_3$, CuO, Au, Ag, and $V_2O_5$.

20 Claims, 5 Drawing Sheets

(56) References Cited

U.S. PATENT DOCUMENTS

| | | | |
|---|---|---|---|
| 5,173,453 | A | 12/1992 | Beall et al. |
| 5,512,520 | A | 4/1996 | Pfitzenmaier |
| 8,048,816 | B2 | 11/2011 | Beall et al. |
| 9,260,342 | B2 | 2/2016 | Borczuch-Laczka et al. |
| 9,321,674 | B2 | 4/2016 | Ritzberger et al. |
| 9,809,488 | B2 | 11/2017 | Beall et al. |
| 10,196,301 | B2 | 2/2019 | Beall et al. |
| 2005/0016521 | A1 | 1/2005 | Witzmann et al. |
| 2013/0045375 | A1 | 2/2013 | Gross |
| 2013/0201678 | A1* | 8/2013 | Siebers .................. C03B 20/00 362/231 |
| 2014/0141960 | A1* | 5/2014 | Borczuch-Laczka ........................ C03C 3/097 501/32 |
| 2016/0102010 | A1* | 4/2016 | Beall ....................... C03C 3/097 428/410 |

OTHER PUBLICATIONS

Hummel; "Thermal Expansion Properties of Some Synthetic Lithia Minerals"; J Am. Ceram. Soc., 1951, 34: 235-239.

International Search Report and Written Opinion of the International Searching Authority; PCT/US2020/034621; dated Aug. 10, 2020; 11 Pages; European Patent Office.

Laczka et al; "Thermal and Spectroscopic Characterization of Glasses and Glass-Ceramics of Li2O—Al2O3—SiO2 (LAS) System"; Journal of Molecular Structure, 1068 (2014): 275-282.

Park et al; "Heat-Resistant Ceramics Based on LAS-System Non-Metallic Mineral and Its Thermal Shock Resistance," J Ceram Soc. Jpn, 2010, 118: 220-225.

Shelby; "Introduction to Glass Science and Technology," The Royal Society of Chemistry, 2005; 58 Pages.

Varshneya; "Fundamentals of Inorganic Glasses," Academic Press Inc., San Diego, CA 1994; 78 Pages.

* cited by examiner

COLORED GLASS-CERAMICS HAVING PETALITE AND LITHIUM SILICATE STRUCTURES

CROSS-REFERENCE TO RELATED APPLICATIONS

This application claims the benefit of priority of U.S. Provisional Application Ser. No. 62/853,953 filed on May 29, 2019, the content of which is relied upon and incorporated herein by reference in its entirety.

BACKGROUND

Field

The present specification generally relates to glass and glass-ceramic compositions and, in particular, to colored glass-ceramic compositions having a combination of petalite and lithium silicate phases.

Technical Background

Transparent or white translucent glass-ceramics based on petalite/lithium disilicate structures may exhibit a combination of high strength and high fracture toughness. Various industries, including the consumer electronics industry, desire colored materials with the same or similar strength and fracture toughness properties. However, the inclusion of colorants in the precursor glass composition may alter the phase assemblage of the glass-ceramic, thereby reducing the strength and fracture toughness.

Accordingly, a need in the art exists for alternative colored glass-ceramics having high strength and fracture toughness.

SUMMARY

According to a first aspect, a glass-ceramic article comprises a petalite crystalline phase and a lithium silicate crystalline phase. The weight percentage of each of the petalite crystalline phase and the lithium silicate crystalline phase in the glass-ceramic article are greater than the weight percentages of each of the other crystalline phases present in the glass-ceramic article. The glass-ceramic article has a transmittance color coordinate in the CIELAB color space of: $L^*$=from 20 to 90; $a^*$=from −20 to 40; and $b^*$=from −60 to 60.

According to a second aspect, a glass-ceramic article comprises a petalite crystalline phase; a lithium silicate crystalline phase; and a residual glass phase comprising a colorant. The glass-ceramic article has a fracture toughness of 1 MPa·m$^{1/2}$ or greater, and the glass-ceramic article has a transmittance color coordinate in the CIELAB color space of: $L^*$=from 20 to 90; $a^*$=from −20 to 40; and $b^*$=from −60 to 60 for a CIE illuminant F02 under SCI UVC conditions.

According to a third aspect, a glass-ceramic article comprises a petalite crystalline phase and a lithium silicate crystalline phase. Each of the petalite crystalline phase and the lithium silicate crystalline phase in the glass-ceramic article have greater weight percentages than other crystalline phases present in the glass-ceramic article. The glass-ceramic article comprises from 0.01 wt % to 5 wt % of a colorant selected from the group consisting of $TiO_2$, $Fe_2O_3$, NiO, $Co_3O_4$, $MnO_2$, $Cr_2O_3$, CuO, Au, Ag, and $V_2O_5$. Additionally, the glass-ceramic article has a transmittance color coordinate in the CIELAB color space of: $L^*$=from 50 to 90; $a^*$=from −20 to 30; and $b^*$=from 0 to 40 for a CIE illuminant F02 under SCI UVC conditions.

According to another aspect, the glass-ceramic article comprises the glass-ceramic article of any of the previous aspects, wherein the glass-ceramic article has a composition comprising, in wt %: $SiO_2$ in an amount of from 55 to 80; $Al_2O_3$ in an amount of from 2 to 20; $Li_2O$ in an amount of from 5 to 20; $P_2O_5$ in an amount of from 0.5 to 6; and $ZrO_2$ in an amount of from 0.2 to 15.

According to another aspect, the glass-ceramic article comprises the glass-ceramic article of any of the previous aspects, wherein the composition further comprises, in wt %, from 0.01 to 5 of a colorant selected from the group consisting of $TiO_2$, $Fe_2O_3$, NiO, $Co_3O_4$, $MnO_2$, $Cr_2O_3$, CuO, Au, Ag, and $V_2O_5$.

According to another aspect, the glass-ceramic article comprises the glass-ceramic article of any of the previous aspects, wherein at least 80 wt % of the colorant in the composition is present in a residual glass phase of the glass-ceramic article.

According to another aspect, the glass-ceramic article comprises the glass-ceramic article of any of the previous aspects, wherein at least 95 wt % of the colorant in the composition is present in a residual glass phase of the glass-ceramic article.

According to another aspect, the glass-ceramic article comprises the glass-ceramic article of any of the previous aspects, wherein the glass-ceramic article has a composition further comprising, in wt %: Au in an amount of from 0.01 to 1.5; or Ag in an amount of from 0.01 to 1.5; or $Cr_2O_3$ in an amount of from 0.05 to 1.0; or CuO in an amount of from 0.1 to 1.5; or NiO in an amount of from 0.1 to 1.5; or $V_2O_5$ in an amount of from 0.1 to 2.0; or $Co_3O_4$ in an amount of from 0.01 to 2.0.

According to another aspect, the glass-ceramic article comprises the glass-ceramic article of any of the previous aspects, wherein the glass-ceramic article has a transmittance color coordinate in the CIELAB color space of: $L^*$=from 50 to 90; $a^*$=from −20 to 30; and $b^*$=from 0 to 40 for a CIE illuminant F02 under SCI UVC conditions.

According to another aspect, the glass-ceramic article comprises the glass-ceramic article of any of the previous aspects, wherein the weight percentage of each of the petalite crystalline phase and the lithium silicate crystalline phase in the glass-ceramic article have greater weight percentages than other crystalline phases present in the glass-ceramic article.

According to another aspect, the glass-ceramic article comprises the glass-ceramic article of any of the previous aspects, wherein the glass-ceramic article has a fracture toughness of 1 MPa·m$^{1/2}$ or greater.

According to another aspect, the glass-ceramic article comprises the glass-ceramic article of any of the previous aspects, wherein the glass-ceramic article has a Vickers hardness of 600 kgf/mm$^2$ or greater.

According to another aspect, the glass-ceramic article comprises the glass-ceramic article of any of the previous aspects, wherein the glass-ceramic article has a ring-on-ring strength of at least 300 MPa.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2:
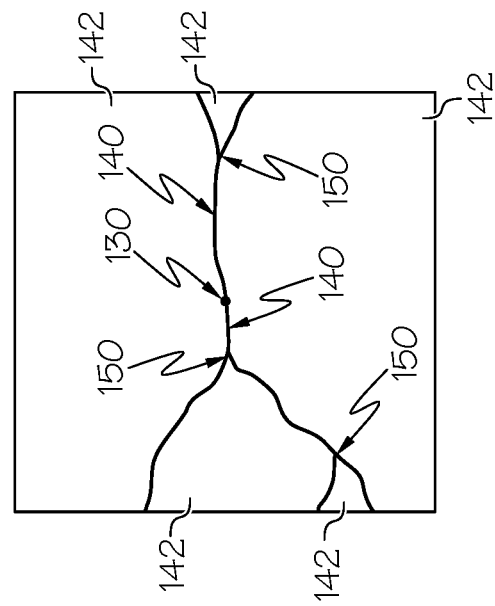
FIG. 2 is a representation of a frangible sample after a frangibility test.

Reference will now be made in detail to various embodiments, examples of which are illustrated in the accompanying drawings. Whenever possible, the same reference numerals will be used throughout the drawings to refer to the same or like parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As a result of the raw materials and/or equipment used to produce the glass or glass-ceramic composition of various embodiments, certain impurities or components that are not intentionally added may be present in the final glass or glass-ceramic composition. Such materials are present in the glass or glass-ceramic composition in minor amounts and are referred to herein as "tramp materials." As used herein, "tramp materials" may be present in an amount of less than 1000 ppm.

As used herein, a glass or glass-ceramic composition having 0 wt % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free," or the like are defined to mean that the compound, molecule, or element was not purposefully added to the composition, but the composition may still comprise iron, sodium, lithium, zirconium, alkali earth metals, or heavy metals, etc., but in approximately tramp or trace amounts (e.g., less than about 1000 Ppm).

Unless otherwise specified, the concentrations of all constituents recited herein are expressed in terms of weight percent (wt %).

In various embodiments, glass-ceramic articles include petalite and lithium silicate as the primary crystalline phases. The lithium silicate crystal phase may be lithium disilicate or lithium metasilicate. In various embodiments, the glass retains a low melting temperature (e.g., below 1500° C.), yet remains compatible with conventional rolling, molding, and float processes. Additionally, lithium silicate is retained as a major crystal phase, providing inherently high mechanical strength and fracture toughness to the glass-ceramic. Petalite, a second major crystal phase of the glass-ceramic, has a fine grain size, which contributes to the transparency or translucency of the glass-ceramic, and can be ion-exchanged for additional mechanical strength.

As used herein, the terms "glass-based" and/or "glass-based article" mean any material or article made at least partially of glass, including glass and glass-ceramic materials.

Petalite ($LiAlSi_4O_{10}$) is a monoclinic crystal possessing a three-dimensional framework structure with a layered structure having folded $Si_2O_5$ layers linked by Li and Al tetrahedral. The Li is in tetrahedral coordination with oxygen. Petalite is a lithium source and is used as a low thermal expansion phase to improve the thermal downshock resistance of glass-ceramic or ceramic parts.

In some embodiments, the weight percentage of the petalite crystalline phase in the glass-ceramic compositions described herein can be in a range from 20 to 70 wt %, 20 to 65 wt %, 20 to 60 wt %, 20 to 55 wt %, 20 to 50 wt %, 20 to 45 wt %, 20 to 40 wt %, 20 to 35 wt %, 20 to 30 wt %, 20 to 25 wt %, 25 to 70 wt %, 25 to 65 wt %, 25 to 60 wt %, 25 to 55 wt %, 25 to 50 wt %, 25 to 45 wt %, 25 to 40 wt %, 25 to 35 wt %, 25 to 30 wt %, 30 to 70 wt %, 30 to 65 wt %, 30 to 60 wt %, 30 to 55 wt %, 30 to 50 wt %, 30 to 45 wt %, 30 to 40 wt %, 30 to 35 wt %, 35 to 70 wt %, 35 to 65 wt %, 35 to 60 wt %, 35 to 55 wt %, 35 to 50 wt %, 35 to 45 wt %, 35 to 40 wt %, 40 to 70 wt %, 40 to 65 wt %, 40 to 60 wt %, 40 to 55 wt %, 40 to 70 wt %, 40 to 45 wt %, 45 to 70 wt %, 45 to 65 wt %, 45 to 60 wt %, 45 to 55 wt %, 45 to 50 wt %, 50 to 70 wt %, 50 to 65 wt %, 50 to 60 wt %, 50 to 55 wt %, 55 to 70 wt %, 55 to 65 wt %, 55 to 60 wt %, 60 to 70 wt %, 60 to 65 wt %, or 65 to 70 wt %, or any and all sub-ranges formed from any of these endpoints.

As noted above, the lithium silicate crystalline phase may be lithium disilicate or lithium metasilicate. Lithium disilicate ($Li_2Si_2O_5$) is an orthorhombic crystal based on corrugated sheets of $\{Si_2O_5\}$ tetrahedral arrays. The crystals are typically tabular or lath-like in shape, with pronounced cleavage planes. Glass-ceramics based on lithium disilicate have highly desirable mechanical properties, including high body strength and fracture toughness, due to their microstructures of randomly-oriented interlocked crystals. This crystal structure forces cracks to propagate through the material via tortuous paths around the interlocked crystals thereby improving the strength and fracture toughness. Lithium metasilicate, $Li_2SiO_3$, has an orthorhombic symmetry with ($Si_2O_6$) chains running parallel to the c axis and linked together by lithium ions. In some embodiments, the weight percentage of the lithium silicate crystalline phase in the glass-ceramic compositions can be in a range from 20 to 60 wt %, 20 to 55 wt %, 20 to 50 wt %, 20 to 45 wt %, 20 to 40 wt %, 20 to 35 wt %, 20 to 30 wt %, 20 to 25 wt %, 25 to 60 wt %, 25 to 55 wt %, 25 to 50 wt %, 25 to 45 wt %, 25 to 40 wt %, 25 to 35 wt %, 25 to 30 wt %, 30 to 60 wt %, 30 to 55 wt %, 30 to 50 wt %, 30 to 45 wt %, 30 to 40 wt %, 30 to 35 wt %, 35 to 60 wt %, 35 to 55 wt %, 35 to 50 wt %, 35 to 45 wt %, 35 to 40 wt %, 40 to 60 wt %, 40 to 55 wt %, 40 to 50 wt %, 40 to 45 wt %, 45 to 60 wt %, 45 to 55 wt %, 45 to 50 wt %, 50 to 60 wt %, 50 to 55 wt %, or 55 to 60 wt %, or any and all sub-ranges formed from any of these endpoints.

There are two broad families of lithium disilicate glass-ceramics. The first group comprises those that are doped with ceria and a noble metal such as silver. These can be photosensitively nucleated via UV light and subsequently heat-treated to produce strong glass-ceramics such as Fotoceram®. The second family of lithium disilicate glass-ceramics is nucleated by the addition of $P_2O_5$, wherein the nucleating phase is $Li_3PO_4$. $P_2O_5$-nucleated lithium disilicate glass-ceramics have been developed for applications as varied as high-temperature sealing materials, disks for computer hard drives, transparent armor, and dental applications.

The glasses and glass-ceramics described herein may be generically described as lithium-containing aluminosilicate glasses or glass-ceramics and comprise $SiO_2$, $Al_2O_3$, and $Li_2O$. In addition to $SiO_2$, $Al_2O_3$, and $Li_2O$, the glasses and glass-ceramics embodied herein may further contain alkali oxides, such as $Na_2O$, $K_2O$, $Rb_2O$, or $Cs_2O$, as well as $P_2O_5$ and $ZrO_2$, and a number of other components as described below. In one or more embodiments, the major crystallite phases include petalite and lithium silicate, but β-spodumene solid solution, β-quartz solid solution, lithium phosphate, cristobalite, and rutile may also be present as minor phases depending on the compositions of the precursor glass. In some embodiments, the glass-ceramic composition has a residual glass content of 5 to 30 wt %, 5 to 25 wt %, 5 to 20 wt %, 5 to 15 wt %, 5 to 10 wt %, 10 to 30 wt %, 10 to 25 wt %, 10 to 20 wt %, 10 to 15 wt %, 15 to 30 wt %, 15 to 25 wt %, 15 to 20 wt %, 20 to 30 wt %, 20 to 25 wt %, or 25 to 30 wt %, as determined according to Rietveld analysis of the XRD spectrum. It should be understood that the residual glass content may be within a sub-range formed from any and all of the foregoing endpoints.

$SiO_2$ is the primary glass former and can function to stabilize the networking structure of glasses and glass-ceramics. In some embodiments, the glass or glass-ceramic composition comprises from 55 to 80 wt % $SiO_2$. In some embodiments, the glass or glass-ceramic composition comprises from 69 to 80 wt % $SiO_2$. In some embodiments, the glass or glass-ceramic composition can comprise from 55 to 80 wt %, 55 to 77 wt %, 55 to 75 wt %, 55 to 73 wt %, 60 to 80 wt %, 60 to 77 wt %, 60 to 75 wt %, 60 to 73 wt %, 65 to 80 wt %, 65 to 77 wt %, 65 to 75 wt %, 65 to 73 wt %, 69 to 80 wt %, 69 to 77 wt %, 69 to 75 wt %, 69 to 73 wt %, 70 to 80 wt %, 70 to 77 wt %, 70 to 75 wt %, 70 to 73 wt %, 73 to 80 wt %, 73 to 77 wt %, 73 to 75 wt %, 75 to 80 wt %, 75 to 77 wt %, or 77 to 80 wt % $SiO_2$, or any and all sub-ranges formed from any of these endpoints.

The concentration of $SiO_2$ should be sufficiently high (greater than 55 wt %) in order to form petalite crystal phase when the precursor glass is heat-treated to convert to a glass-ceramic. In other words, the concentration $SiO_2$, should be high enough to yield both the lithium silicate and petalite phases. The amount of $SiO_2$ may be limited to control melting temperature (200 poise temperature), as the melting temperature of pure $SiO_2$ or high-$SiO_2$ glasses is undesirably high.

Like $SiO_2$, $Al_2O_3$ may also provide stabilization to the network and also provides improved mechanical properties and chemical durability. If the amount of $Al_2O_3$ is too high, however, the fraction of lithium silicate crystals may be decreased, possibly to the extent that an interlocking structure cannot be formed. The amount of $Al_2O_3$ can be tailored to control viscosity. Further, if the amount of $Al_2O_3$ is too high, the viscosity of the melt is also generally increased. In some embodiments, the glass or glass-ceramic composition can comprise from 2 to 20 wt % $Al_2O_3$. In some embodiments, the glass or glass-ceramic composition can comprise from 6 to 9 wt % $Al_2O_3$. In some embodiments, the glass or glass-ceramic composition can comprise from 2 to 20 wt %, 2 to 18 wt %, 2 to 15 wt %, 2 to 12 wt %, 2 to 10 wt %, 2 to 9 wt %, 2 to 8 wt %, 2 to 5 wt %, 5 to 20 wt %, 5 to 18 wt %, 5 to 15 wt %, 5 to 12 wt %, 5 to 10 wt %, 5 to 9 wt %, 5 to 8 wt %, 6 to 20 wt %, 6 to 18 wt %, 6 to 15 wt %, 6 to 12 wt %, 6 to 10 wt %, 6 to 9 wt %, 8 to 20 wt %, 8 to 18 wt %, 8 to 15 wt %, 8 to 12 wt %, 8 to 10 wt %, 10 to 20 wt %, 10 to 18 wt %, 10 to 15 wt %, 10 to 12 wt %, 12 to 20 wt %, 12 to 18 wt %, or 12 to 15 wt % $Al_2O_3$ or any and all sub-ranges formed from any of these endpoints.

In the glass and glass-ceramics described herein, $Li_2O$ aids in forming both petalite and lithium silicate crystal phases. To obtain petalite and lithium silicate as the predominant crystal phases, it is desirable to have at least 7 wt % $Li_2O$ in the composition. However, if the concentration of $Li_2O$ is too high—greater than 15 wt %—the composition becomes very fluid and the delivery viscosity is low enough that a sheet cannot be formed. In some embodied compositions, the glass or glass-ceramic can comprise from 5 wt % to 20 wt % $Li_2O$. In other embodiments, the glass or glass-ceramic can comprise from 10 wt % to 14 wt % $Li_2O$.

In some embodiments, the glass or glass-ceramic composition can comprise from 5 to 20 wt %, 5 to 18 wt %, 5 to 16 wt %, 5 to 14 wt %, 5 to 12 wt %, 5 to 10 wt %, 5 to 8 wt %, 7 to 20 wt %, 7 to 18 wt %, 7 to 16 wt %, 7 to 14 wt %, 7 to 12 wt %, 7 to 10 wt %, 10 to 20 wt %, 10 to 18 wt %, 10 to 16 wt %, 10 to 14 wt %, 10 to 12 wt %, 12 to 20 wt %, 12 to 18 wt %, 12 to 16 wt %, 12 to 14 wt %, 14 to 20 wt %, 14 to 18 wt %, 14 to 16 wt %, 16 to 20 wt %, 16 to 18 wt %, or 18 to 20 wt % $Li_2O$, or any and all sub-ranges formed from any of these endpoints.

As noted above, $Li_2O$ is generally useful for forming the embodied glass-ceramics, but the other alkali oxides (e.g., $K_2O$ and $Na_2O$) tend to decrease glass-ceramic formation and form an aluminosilicate residual glass in the glass-ceramic rather than a ceramic phase. It has been found that more than 5 wt % $Na_2O$ or $K_2O$, or combinations thereof, leads to an undesirable amount of residual glass which can lead to deformation during crystallization and undesirable microstructures from a mechanical property perspective. However, levels below 5 wt % may be advantageous for ion exchange, enabling higher surface compression and/or metrology. In the embodiments described herein, the composition of the residual glass may be tailored to control viscosity during crystallization, minimizing deformation or undesirable thermal expansion, or control microstructure properties. In general, the compositions described herein have low amounts of non-lithium alkali oxides. In some embodiments, the glass or glass-ceramic composition can comprise from 0 to 5 wt % $R_2O$, wherein R is one or more of the alkali cations Na and K. In some embodiments, the glass or glass-ceramic composition can comprise from 1 to 3 wt % $R_2O$, wherein R is one or more of the alkali cations Na and K. In some embodiments, the glass or glass-ceramic composition can comprise from 0 to 5 wt %, 0 to 4 wt %, 0 to 3 wt %, 0 to 2 wt %, 0 to 1 wt %, >0 to 5 wt %, >0 to 4 wt %, >0 to 3 wt %, >0 to 2 wt %, >0 to 1 wt %, to 5 wt %, 0 to 4 wt %, 0 to 3 wt %, 0 to 2 wt %, 0 to 1 wt %, 1 to 5 wt %, 1 to 4 wt %, 1 to 3 wt %, 1 to 2 wt %, 2 to 5 wt %, 2 to 4 wt %, 2 to 3 wt %, 3 to 5 wt %, 3 to 4 wt %, or 4 to 5 wt % $Na_2O$, $K_2O$, or combinations thereof. It should be understood that the $R_2O$ concentration may be within a sub-range formed from any and all of the foregoing endpoints.

The glass and glass-ceramic compositions can include $P_2O_5$. $P_2O_5$ can function as a nucleating agent to produce bulk nucleation of the crystalline phase(s) from the glass and glass-ceramic compositions. If the concentration of $P_2O_5$ is too low, the precursor glass does crystallize, but only at higher temperatures (due to a lower viscosity); however, if the concentration of $P_2O_5$ is too high, devitrification upon cooling during precursor glass forming can be difficult to control. Embodiments can comprise from >0 to 6 wt % $P_2O_5$. Other embodiments can comprise 2 to 4 wt % $P_2O_5$. Still other embodiments can comprise 1.5 to 2.5 wt % $P_2O_5$. Embodied compositions can comprise from 0 to 6 wt %, 0 to 5.5 wt %, 0 to 5 wt %, 0 to 4.5 wt %, 0 to 4 wt %, 0 to 3.5 wt %, 0 to 3 wt %, 0 to 2.5 wt %, 0 to 2 wt %, 0 to 1.5 wt %, 0 to 1 wt %, >0 to 6 wt %, >0 to 5.5 wt %, >0 to 5 wt %, >0 to 4.5 wt %, >0 to 4 wt %, >0 to 3.5 wt %, >0 to 3 wt %, >0 to 2.5 wt %, >0 to 2 wt %, >0 to 1.5 wt %, >0 to 1 wt %, 0.5 to 6 wt %, 0.5 to 5.5 wt %, 0.5 to 5 wt %, 0.5 to 4.5 wt %, 0.5 to 4 wt %, 0.5 to 3.5 wt %, 0.5 to 3 wt %, 0.5 to 2.5 wt %, 0.5 to 2 wt %, 0.5 to 1.5 wt %, 0.5 to 1 wt %, 1 to 6 wt %, 1 to 5.5 wt %, 1 to 5 wt %, 1 to 4.5 wt %, 1 to 4 wt %, 1 to 3.5 wt %, 1 to 3 wt %, 1 to 2.5 wt %, 1 to 2 wt %, 1 to 1.5 wt %, 1.5 to 6 wt %, 1.5 to 5.5 wt %, 1.5 to 5 wt %, 1.5 to 4.5 wt %, 1.5 to 4 wt %, 1.5 to 3.5 wt %, 1.5 to 3 wt %, 1.5 to 2.5 wt %, 1.5 to 2 wt %, 2 to 6 wt %, 2 to 5.5 wt %, 2 to 5 wt %, 2 to 4.5 wt %, 2 to 4 wt %, 2 to 3.5 wt %, 2 to 3 wt %, 2 to 2.5 wt %, 2.5 to 6 wt %, 2.5 to 5.5 wt %, 2.5 to 5 wt %, 2.5 to 4.5 wt %, 2.5 to 4 wt %, 2.5 to 3.5 wt %, 2.5 to 3 wt %, 3 to 6 wt %, 3 to 5.5 wt %, 3 to 5 wt %, 3 to 4.5 wt %, 3 to 4 wt %, 3 to 3.5 wt %, 3.5 to 6 wt %, 3.5 to 5.5 wt %, 3.5 to 5 wt %, 3.5 to 4.5 wt %, 3.5 to 4 wt %, 4 to 6 wt %, 4 to 5.5 wt %, 4 to 5 wt %, 4 to 4.5 wt %, 4.5 to 6 wt %, 4.5 to 5.5 wt %, 4.5 to 5 wt %, 5 to 6 wt %, 5 to 5.5 wt %, or 5.5 to 6 wt % $P_2O_5$, or any and all sub-ranges formed from any of these endpoints.

In the glass and glass-ceramics described herein, additions of $ZrO_2$ can improve the stability of $Li_2O$—$Al_2O_3$—$SiO_2$—$P_2O_5$ glass by significantly reducing glass devitrification during forming and decreasing the liquidus temperature. At concentrations greater than 8 wt %, $ZrO_2$ can form a primary liquidus phase at a high temperature, which significantly lowers the liquidus viscosity. Transparent glasses can be formed when the glass contains over 2 wt % $ZrO_2$. The addition of $ZrO_2$ can also decrease the petalite grain size, which aids in the formation of a transparent glass-ceramic. In some embodiments, the glass or glass-ceramic composition can comprise from 0.2 to 15 wt % $ZrO_2$. In some embodiments, the glass or glass-ceramic composition can comprise from 2 to 4 wt % $ZrO_2$. In some embodiments, the glass or glass-ceramic composition can comprise from 0.2 to 15 wt %, 0.2 to 12 wt %, 0.2 to 10 wt %, 0.2 to 8 wt %, 0.2 to 6 wt %, 0.2 to 4 wt %, 0.5 to 15 wt %, 0.5 to 12 wt %, 0.5 to 10 wt %, 0.5 to 8 wt %, 0.5 to 6 wt %, 0.5 to 4 wt %, 1 to 15 wt %, 1 to 12 wt %, 1 to 10 wt %, 1 to 8 wt %, 1 to 6 wt %, 1 to 4 wt %, 2 to 15 wt %, 2 to 12 wt %, 2 to 10 wt %, 2 to 8 wt %, 2 to 6 wt %, 2 to 4 wt %, 3 to 15 wt %, 3 to 12 wt %, 3 to 10 wt %, 3 to 8 wt %, 3 to 6 wt %, 3 to 4 wt %, 4 to 15 wt %, 4 to 12 wt %, 4 to 10 wt %, 4 to 8 wt %, 4 to 6 wt %, 8 to 15 wt %, 8 to 12 wt %, 8 to 10 wt %, 10 to 15 wt %, 10 to 12 wt %, or 12 to 15 wt % $ZrO_2$, or any and all sub-ranges formed from any of these endpoints.

$B_2O_3$ decreases the melting temperature of the glass precursor. Furthermore, the addition of $B_2O_3$ in the precursor glass and, thus, the glass-ceramics helps achieve an interlocking crystal microstructure and can also improve the damage resistance of the glass-ceramic. When boron in the residual glass is not charge balanced by alkali oxides or divalent cation oxides (such as MgO, CaO, SrO, BaO, and ZnO), it will be in trigonal-coordination state (or three-coordinated boron), which opens up the structure of the glass. The network around these three-coordinated boron atoms is not as rigid as tetrahedrally coordinated (or four-coordinated) boron. Without being bound by theory, it is believed that precursor glasses and glass-ceramics that include three-coordinated boron can tolerate some degree of deformation before crack formation compared to four-coordinated boron. By tolerating some deformation, the Vickers indentation crack initiation threshold values increase. Fracture toughness of the precursor glasses and glass-ceramics that include three-coordinated boron may also increase. Without being bound by theory, it is believed that the presence of boron in the residual glass of the glass-ceramic (and precursor glass) lowers the viscosity of the residual glass (or precursor glass), which facilitates the growth of lithium silicate crystals, especially large crystals having a high aspect ratio. A greater amount of three-coordinated boron (in relation to four-coordinated boron) is believed to result in glass-ceramics that exhibit a greater Vickers indentation crack initiation load. In some embodiments, the amount of three-coordinated boron (as a percent of total $B_2O_3$) may be 40% or greater, 50% or greater, 75% or greater, 85% or greater, or even 95% or greater. The amount of boron in general should be controlled to maintain chemical durability and mechanical strength of the cerammed bulk glass-ceramic. In other words, the amount of boron should be limited to less than 10 wt % in order to maintain chemical durability and mechanical strength.

In one or more embodiments, the glasses and glass-ceramics herein can comprise from 0 to 10 wt % or from 0 to 2 wt % $B_2O_3$. In some embodiments, the glass or glass-ceramic composition can comprise from 0 to 10 wt %, 0 to 9 wt %, 0 to 8 wt %, 0 to 7 wt %, 0 to 6 wt %, 0 to 5 wt %, 0 to 4 wt %, 0 to 3 wt %, 0 to 2 wt %, 0 to 1 wt %, >0 to 10 wt %, >0 to 9 wt %, >0 to 8 wt %, >0 to 7 wt %, >0 to 6 wt %, >0 to 5 wt %, >0 to 4 wt %, >0 to 3 wt %, >0 to 2 wt %, >0 to 1 wt %, 1 to 10 wt %, 1 to 8 wt %, 1 to 6 wt %, 1 to 5 wt %, 1 to 4 wt %, 1 to 2 wt %, 2 to 10 wt %, 2 to 8 wt %, 2 to 6 wt %, 2 to 5 wt %, 2 to 4 wt %, 3 to 10 wt %, 3 to 8 wt %, 3 to 6 wt %, 3 to 5 wt %, 3 to 4 wt %, 4 to 10 wt %, 4 to 8 wt %, 4 to 6 wt %, 4 to 5 wt %, 5 to 10 wt %, 5 to 8 wt %, 5 to 7.5 wt %, 5 to 6 wt %, or 5 wt % to 5.5 wt % 8203, or any and all sub-ranges formed from any of these endpoints.

MgO can enter petalite crystals in a partial solid solution. In one or more embodiments, the glasses and glass-ceramics described herein can comprise from 0 to 8 wt % MgO. In some embodiments, the glass or glass-ceramic composition can comprise from 0 to 8 wt %, %, 0 to 7 wt %, 0 to 6 wt %, 0 to 5 wt %, 0 to 4 wt %, 0 to 3 wt %, 0 to 2 wt %, 0 to 1 wt %, >0 to 8 wt %, >0 to 7 wt %, >0 to 6 wt %, >0 to 5 wt %, >0 to 4 wt %, >0 to 3 wt %, >0 to 2 wt %, >0 to 1 wt %, 1 to 8 wt %, 1 to 7 wt %, 1 to 6 wt %, 1 to 5 wt %, 1 to 4 wt %, 1 to 3 wt %, 1 to 2 wt %, 2 to 8 wt %, 2 to 7 wt %, 2 to 6 wt %, 2 to 5 wt %, 2 to 4 wt %, 2 to 3 wt %, 3 to 8 wt %, 3 to 7 wt %, 3 to 6 wt %, 3 to 5 wt %, 3 to 4 wt %, 4 to 8 wt %, 4 to 7 wt %, 4 to 6 wt %, 4 to 5 wt %, 5 to 8 wt %, 5 to 7 wt %, 5 to 6 wt %, 6 to 8 wt %, 6 to 7 wt %, or 7 wt % to 8 wt % MgO, or any and all sub-ranges formed from any of these endpoints.

ZnO can enter petalite crystals in a partial solid solution. In one or more embodiments, the glasses and glass-ceramics herein can comprise from 0 to 10 wt % ZnO. In some embodiments, the glass or glass-ceramic composition can comprise from 0 to 10 wt %, 0 to 9 wt %, 0 to 8 wt %, 0 to 7 wt %, 0 to 6 wt %, 0 to 5 wt %, 0 to 4 wt %, 0 to 3 wt %, 0 to 2 wt %, 0 to 1 wt %, 1 to 10 wt %, 1 to 9 wt %, 1 to 8 wt %, 1 to 7 wt %, 1 to 6 wt %, 1 to 5 wt %, 1 to 4 wt %, 1 to 3 wt %, 1 to 2 wt %, 2 to 10 wt %, 2 to 9 wt %, 2 to 8 wt %, 2 to 7 wt %, 2 to 6 wt %, 2 to 5 wt %, 2 to 4 wt %, 2 to 3 wt %, 3 to 10 wt %, 3 to 9 wt %, 3 to 8 wt %, 3 to 7 wt %, 3 to 6 wt %, 3 to 5 wt %, 3 to 4 wt %, 4 to 10 wt %, 4 to 9 wt %, 4 to 8 wt %, 4 to 7 wt %, 4 to 6 wt %, 4 to 5 wt %, 5 to 10 wt %, 5 to 9 wt %, 5 to 8 wt %, 5 to 7 wt %, 5 to 6 wt %, 6 to 10 wt %, 6 to 9 wt %, 6 to 8 wt %, 6 to 7 wt %, 7 to 10 wt %, 7 to 9 wt %, 7 to 8 wt %, 8 to 10 wt %, 8 to 9 wt %, or 9 to 10 wt % ZnO, or any and all sub-ranges formed from any of these endpoints.

$TiO_2$ may be added to the glass composition in order to provide color to the glass or glass-ceramic. In one or more embodiments, the glasses and glass-ceramics herein can comprise from 0 to 5 wt % $TiO_2$. In some embodiments, the glass or glass-ceramic composition can comprise from 0 to 5 wt %, 0 to 4 wt %, 0 to 3 wt %, 0 to 2 wt %, 0 to 1 wt %, 1 to 5 wt %, 1 to 4 wt %, 1 to 3 wt %, 1 to 2 wt %, 2 to 5 wt %, 2 to 4 wt %, 2 to 3 wt %, 3 to 5 wt %, 3 to 4 wt %, or 4 to 5 wt % $TiO_2$, or any and all sub-ranges formed from any of these endpoints.

$CeO_2$ may be added to the glass composition as a fining agent. In one or more embodiments, the glasses and glass-ceramics herein can comprise from 0 to 0.4 wt % $CeO_2$. In some embodiments, the glass or glass-ceramic composition can comprise from 0 to 0.4 wt %, 0 to 0.3 wt %, 0 to 0.2 wt %, 0 to 0.1 wt %, 0.1 to 0.4 wt %, 0.1 to 0.3 wt %, 0.1 to 0.2 wt %, 0.2 to 0.4 wt %, 0.2 to 0.3 wt %, or 0.3 wt % to 0.4 wt % Ce02, or any and all sub-ranges formed from any of these endpoints.

In one or more embodiments, the glasses and glass-ceramics can comprise from 0 to 0.5 wt % $SnO_2$, or another fining agent. In some embodiments, the glass or glass-ceramic composition can comprise from 0 to 0.5 wt %, 0 to 0.4 wt %, 0 to 0.3 wt %, 0 to 0.2 wt %, 0 to 0.1 wt %, 0.05 to 0.5 wt %, 0.05 to 0.4 wt %, 0.05 to 0.3 wt %, 0.05 to 0.2 wt %, 0.05 to 0.1 wt %, 0.1 to 0.5 wt %, 0.1 to 0.4 wt %, 0.1 to 0.3 wt %, 0.1 to 0.2 wt %, 0.2 to 0.5 wt %, 0.2 to 0.4 wt %, 0.2 to 0.3 wt %, 0.3 to 0.5 wt %, 0.3 wt % to 0.4 wt %, or 0.4 to 0.5 wt % $SnO_2$, or any and all sub-ranges formed from any of these endpoints.

In some embodiments, the sum of the weight percentage of $P_2O_5$ and $ZrO_2$ in the glasses and glass-ceramics can be greater than or equal to 3 wt %, 4 wt %, or 5 wt % to increase nucleation. An increase in nucleation associated with higher concentrations of these components may lead to the production of finer grains.

In various embodiments described herein, the glass or glass-ceramics further include from 0.01 to 5 wt % of one or more colorants in the form of transition metal oxides. The colorant may be $TiO_2$, $Fe_2O_3$, NiO, $Co_3O_4$, $MnO_2$, $Cr_2O_3$, CuO, Au, Ag, $V_2O_5$, or combinations thereof. In some embodiments, the glass or glass-ceramic composition may comprise from 0.01 to 5 wt %, 0.01 to 4.5 wt %, 0.01 to 4 wt %, 0.01 to 3.5 wt %, 0.01 to 3 wt %, 0.01 to 2.5 wt %, 0.01 to 2 wt %, 0.01 to 1.5 wt %, 0.01 to 1 wt %, 0.1 to 5 wt %, 0.1 to 4.5 wt %, 0.1 to 4 wt %, 0.1 to 3.5 wt %, 0.1 to 3 wt %, 0.1 to 2.5 wt %, 0.1 to 2 wt %, 0.1 to 1.5 wt %, 0.1 to 1 wt %, 0.25 to 5 wt %, 0.25 to 4.5 wt %, 0.25 to 4 wt %, 0.25 to 3.5 wt %, 0.25 to 3 wt %, 0.25 to 2.5 wt %, 0.25 to 2 wt %, 0.25 to 1.5 wt %, 0.25 to 1 wt %, 0.5 to 5 wt %, 0.5 to 4.5 wt %, 0.5 to 4 wt %, 0.5 to 3.5 wt %, 0.5 to 3 wt %, 0.5 to 2.5 wt %, 0.5 to 2 wt %, 0.5 to 1.5 wt %, 0.5 to 1 wt %, 1 to 5 wt %, 1 to 4.5 wt %, 1 to 4 wt %, 1 to 3.5 wt %, 1 to 3 wt %, 1 to 2.5 wt %, or 1 to 2 wt % of a colorant selected from the group consisting of $TiO_2$, $Fe_2O_3$, NiO, $Co_3O_4$, $MnO_2$, $Cr_2O_3$, CuO, Au, Ag, and $V_2O_5$. It should be understood that the colorant concentration may be within a sub-range formed from any and all of the foregoing endpoints. In some embodiments, when the glass or glass-ceramic composition comprises Au, the composition further comprises from 0.05 to 0.5 wt % SnO and/or $SnO_2$.

In embodiments described herein, the particular amount of colorant may be selected to achieve a particular predetermined color of the glass-ceramic. In some embodiments, the glass or glass-ceramic composition can comprise one or more of Au in an amount of from 0.01 wt % to 1.5 wt % or from 0.8 wt % to 1.25 wt %; Ag in an amount of from 0.01 wt % to 1.5 wt % or 0.8 wt % to 1.25 wt %; $Cr_2O_3$ in an amount of from 0.05 wt % to 1.0 wt % or from 0.22 wt % to 0.26 wt %; CuO in an amount of from 0.1 wt % to 1.5 wt % or from 0.8 wt % to 1.25 wt %; NiO in an amount of from 0.1 wt % to 2.0 wt % or from 0.8 wt % to 1.25 wt %; $V_2O_5$ in an amount of from 0.1 wt % to 2.0 wt % or from 0.8 wt % to 1.25 wt %; and/or $Co_3O_4$ in an amount of from 0.01 wt % to 2.0 wt %. In embodiments, the glass-ceramic has a transmittance color coordinate in the CIELAB color space of the following ranges: L*=from 20 to 90; a*=from −20 to 40; and b*=from −60 to 60 for a CIE illuminant F02 under SCI UVC conditions. In some embodiments, the glass-ceramic article has a transmittance color coordinate in the CIELAB color space of the following ranges: L*=from 50 to 90; a*=from −20 to 30; and b*=from 0 to 40 for a CIE illuminant F02 under SCI UVC conditions.

In various embodiments described herein, a majority of the colorant remains in the residual glass phase of the glass-ceramic. Accordingly, the colorant may be added without altering the phase assembly of the glass-ceramic. Additionally or alternatively, the colorant adds color to the glass or glass-ceramic without significantly changing the melting or forming viscosity as compared to an otherwise identical glass or glass-ceramic that does not include the colorant. In one or more embodiments, at least 80 wt % of the colorant is present in the residual glass phase of the glass-ceramic. In embodiments, at least 80 wt %, at least 85 wt %, at least 90 wt %, at least 95 wt %, or at least 99 wt % of the colorant is present in the residual glass phase of the glass-ceramic.

In some embodiments, the glass-ceramic is absorbing over the visible light range (wavelengths of about 390 nm to about 700 nm). In some embodiments, a glass-ceramic can have an average transmittance in a range from 20% to less than 90% of light over the wavelength range of 400 nm to 1000 nm for a glass-ceramic article having a thickness of 1 mm.

In some embodiments, the glass or glass-ceramic composition may further include tramp materials, such as $TiO_2$, MnO, ZnO, $Nb_2O_5$, $MoO_3$, $Ta_2O_5$, $WO_3$, $Y_2O_3$, $La_2O_3$, $HfO_2$, CdO, $As_2O_3$, $Sb_2O_3$, sulfur-based compounds, such as sulfates, halogens, or combinations thereof. In some embodiments, antimicrobial components, chemical fining agents, or other additional components may be included in the glass or glass-ceramic composition.

In some embodiments, the glasses and/or glass-ceramics described herein can be manufactured into sheets via processes, including, but not limited to, fusion forming, slot draw, float, rolling, and other sheet-forming processes known to those in the art.

The articles formed from the glass-ceramics described herein can be any suitable thickness, which may vary depending on the particular application for use of the glass-ceramic. Glass sheet and or glass-ceramic embodiments may have a thickness of from 0.4 mm to 10 mm. Some embodiments may have a thickness of 6 mm or less, 5 mm or less, 3 mm or less, 2 mm or less, 1.0 mm or less, 750 µm or less, 500 µm or less, or 250 µm or less. Some glass or glass-ceramic sheet embodiments may have a thickness of from 200 µm to 5 mm, 500 µm to 5 mm, 200 µm to 4 mm, 200 µm to 2 mm, 400 µm to 5 mm, or 400 µm to 2 mm. In some embodiments, the thickness may be from 3 mm to 6 mm or from 0.8 mm to 3 mm. It should be understood that the thickness of the article may be within a sub-range formed from any and all of the foregoing endpoints.

In some embodiments, the articles formed from the glass-ceramics described herein have an equibiaxial flexural strength of 300 MPa or greater, 325 MPa or greater, 350 MPa or greater, 400 MPa or greater, 425 MPa or greater, or 450 MPa or greater on a 1 mm thick glass-ceramic. The equibiaxial flexural strength can also be referred to as a ring-on-ring (RoR) strength, which is measured according to the procedure set forth in ASTM C1499-05, with a few modifications to test fixtures and test conditions as outlined in U.S. Patent Application Publication No. 2013/0045375 at paragraph [0027], which is incorporated herein by reference.

An abraded ring-on-ring (aRoR) strength can also be measured using the procedure described above if the glass-ceramic is first subjected to abrasion, typically with silicon carbide particles. Some embodiments also include a chemically-strengthenable glass-ceramic with a petalite phase that leads to increased flexural strength. In such embodiments, the RoR strength may be 500 MPa or greater, 550 MPa or greater, 600 MPa or greater, 650 MPa or greater, 700 MPa or greater, 750 MPa or greater, or 800 MPa or greater.

Some embodiments of the glass-ceramics exhibit high fracture toughness ($K_{Ic}$) and an inherent damage resistance. As mentioned above, some embodiments of the glass-ceramic include interlocking lithium silicate crystals, which result in a high fracture toughness. The glass-ceramic of one or more embodiments may include boron, which may be present as three-coordinated boron in the residual glass phase of the glass-ceramic, as described herein. In such embodiments, the three-coordinated boron is provided by the inclusion of $B_2O_3$ in the precursor glass.

In one or more embodiments, the glass-ceramics exhibit a fracture toughness of 1.0 MPa·m$^{1/2}$ or greater, 1.1 MPa·m$^{1/2}$ or greater, 1.2 MPa·m$^{1/2}$ or greater, 1.3 MPa·m$^{1/2}$ or greater, 1.4 MPa·m$^{1/2}$ or greater, 1.5 MPa·m$^{1/2}$ or greater, 1.6 MPa·m$^{1/2}$ or greater, 1.7 MPa·m$^{1/2}$ or greater, 1.8 MPa·m$^{1/2}$ or greater, 1.9 MPa·m$^{1/2}$ or greater, 2.0 MPa·m$^{1/2}$ or greater. In some embodiments, the fracture toughness is in the range of from 1 to 2 MPa·m$^{1/2}$. It should be understood that the fracture toughness of the glass-ceramics may be within a sub-range formed from any and all of the foregoing endpoints. The fracture toughness may be measured using known methods in the art, for example, using a chevron notch short beam test, according to ASTM C1421-10, "Standard Test Methods for Determination of Fracture Toughness of Advanced Ceramics at Ambient Temperature."

In one or more embodiments, the glass-ceramics have high crack and scratch resistance, as indicated by a Vickers hardness of at least 600 kgf/mm$^2$. In some embodiments, a non-ion-exchanged glass-ceramic exhibits a Vickers hardness in the range of from 600 to 900 kgf/mm$^2$, 600 to 875 kgf/mm$^2$, 600 to 850 kgf/mm$^2$, 600 to 825 kgf/mm$^2$, 600 to 800 kgf/mm$^2$, 600 to 775 kgf/mm$^2$, 600 to 750 kgf/mm$^2$, 600 to 725 kgf/mm$^2$, 600 to 700 kgf/mm$^2$, 700 to 900 kgf/mm$^2$, 700 to 875 kgf/mm$^2$, 700 to 850 kgf/mm$^2$, 700 to 825 kgf/mm$^2$, 700 to 800 kgf/mm$^2$. In some embodiments, the glass-ceramic has a Vickers hardness of 600 kgf/mm$^2$ or greater, 625 kgf/mm$^2$ or greater, 650 kgf/mm$^2$ or greater, 675 kgf/mm$^2$ or greater, 700 kgf/mm$^2$ or greater, 725 kgf/mm$^2$ or greater, 750 kgf/mm$^2$ or greater, 775 kgf/mm$^2$ or greater, 800 kgf/mm$^2$ or greater, 825 kgf/mm$^2$ or greater, 850 kgf/mm$^2$ or greater, 875 kgf/mm$^2$ or greater, or 900 kgf/mm$^2$ or greater. It should be understood that the Vickers hardness of the glass-ceramics may be within a sub-range formed from any and all of the foregoing endpoints. Vickers hardness may be measured according to ASTM C1326 and C1327 (and its progeny, all herein incorporated by reference), "Standard Test Methods for Vickers Indentation Hardness of Advanced Ceramics." In some embodiments, the glass-ceramics exhibit such Vickers hardness values after being chemically strengthened via ion-exchange.

Figure 1:
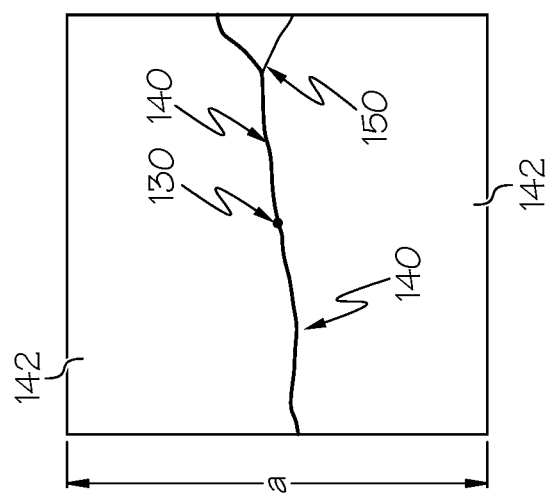
FIG. 1 is a representation of a non-frangible sample after a frangibility test.

In some embodiments, the glass-ceramics disclosed herein are not frangible upon being ion-exchanged. Frangible behavior refers to specific fracture behavior when a glass-based article is subjected to an impact or insult. As utilized herein, a glass-based article is considered non-frangible when it exhibits at least one of the following in a test area as the result of a frangibility test: (1) four or less fragments with a largest dimension of at least 1 mm, and/or (2) the number of bifurcations is less than or equal to the number of crack branches. The fragments, bifurcations, and crack branches are counted based on any 2 inch by 2 inch square centered on the impact point. Thus, a glass-based article is considered non-frangible if it meets one or both of tests (1) and (2) for any 2 inch by 2 inch square centered on the impact point where the breakage is created according to the procedure described below. In a frangibility test, an impact probe is brought in to contact with the glass-based article, with the depth to which the impact probe extends into the glass-based article increasing in successive contact iterations. The step-wise increase in depth of the impact probe allows the flaw produced by the impact probe to reach the tension region while preventing the application of excessive external force that would prevent the accurate determination of the frangible behavior of the glass-based article. In one embodiment, the depth of the impact probe in the glass-based article may increase by about 5 µm in each iteration, with the impact probe being removed from contact with the glass-based article between each iteration. The test area is any 2 inch by 2 inch square centered at the impact point. FIG. 1 depicts a non-frangible test result. As shown in FIG. 1, the test area is a square that is centered at the impact point 130, where the length of a side of the square a is 2 inches. The non-frangible sample shown in FIG. 1 includes three fragments 142, and two crack branches 140 and a single bifurcation 150. Thus, the non-frangible sample shown in FIG. 1 contains less than 4 fragments having a largest dimension of at least 1 mm and the number of bifurcations is less than or equal to the number of crack branches. As utilized herein, a crack branch originates at the impact point, and a fragment is considered to be within the test area if any part of the fragment extends into the test area. While coatings, adhesive layers, and the like may be used in conjunction with the strengthened glass-based articles described herein, such external restraints are not used in determining the frangibility or frangible behavior of the glass-based articles. In some embodiments, a film that does not affect the fracture behavior of the glass-based article may be applied to the glass-based article prior to the frangibility test to prevent the ejection of fragments from the glass-based article, increasing safety for the person performing the test.

A frangible sample is depicted in FIG. 2. The frangible sample includes 5 fragments 142 having a largest dimension of at least 1 mm. The sample depicted in FIG. 2 includes 2 crack branches 140 and 3 bifurcations 150, producing more bifurcations than crack branches. Thus, the sample depicted in FIG. 2 does not exhibit either four or less fragments or the number of bifurcations being less than or equal to the number of crack branches.

In the frangibility test described herein, the impact is delivered to the surface of the glass-based article with a force that is just sufficient to release the internally stored energy present within the strengthened glass-based article. That is, the point impact force is sufficient to create at least one new crack at the surface of the strengthened glass-based article and extend the crack through the compressive stress CS region (i.e., depth of compression) into the region that is under central tension CT. As used herein, "depth of compression" (DOC) means the depth at which the stress in the chemically strengthened article described herein changes from compressive to tensile.

Accordingly, the chemically strengthened glasses described herein are "non-frangible"—i.e., they do not exhibit frangible behavior as described hereinabove when subjected to impact by a sharp object.

In addition, various embodiments of the glass and glass-ceramic compositions are ion exchangeable by those methods widely known in the art. In typical ion exchange processes, smaller metal ions in the glass are replaced or "exchanged" with larger metal ions of the same valence within a layer that is close to the outer surface of the glass and/or glass-ceramic. The replacement of smaller ions with larger ions creates a compressive stress within the layer of the glass and/or glass-ceramic. In one embodiment, the metal ions are monovalent metal ions (e.g., $Na^+$, $K^+$, and the like), and ion exchange is accomplished by immersing the glass and/or glass-ceramic in a bath comprising at least one molten salt of the larger metal ion that is to replace the smaller metal ion in the glass or glass-ceramic. Alternatively, other monovalent ions such as $Ag^+$, $Tl^+$, $Cu^+$, and the like may be exchanged for monovalent ions. The ion exchange process or processes that are used to strengthen the glass and/or glass-ceramic can include, but are not limited to, immersion in a single bath or multiple baths of like or different compositions with washing and/or annealing steps between immersions. In one or more embodiments, the glasses and/or glass-ceramics may be ion exchanged by exposure to molten $NaNO_3$ at a temperature of 430° C. In such embodiments, the $Na^+$ ions replace some portion of the Li ions in the glass-ceramic to develop a surface compressive layer and exhibit high crack resistance. The resulting compressive stress layer may have a depth (also referred to as a "depth of compression") of at least 100 µm on the surface of the glass-ceramic in 2 hours. In such embodiments, the depth of compression can be determined from the $Na_2O$ concentration profile. In other examples, embodiments may be ion exchanged by exposure to molten $KNO_3$ at a temperature of 410° C. for 2 hours to produce a depth of compression of at least 10 µm. In some embodiments, the glass-ceramics may be ion exchanged to achieve a depth of compression of 10 µm or greater, 20 µm or greater, 30 µm or greater, 40 µm or greater, 50 µm or greater, 60 µm or greater, 70 µm or greater, 80 µm or greater, 90 µm or greater, or 100 µm or greater. In other embodiments, the glass-ceramics are ion exchanged to achieve a central tension of at least 10 MPa. The development of this surface compression layer is beneficial for achieving a better crack resistance and higher flexural strength compared to non-ion-exchanged materials. The surface compression layer has a higher concentration of the ion exchanged into the glass-ceramic article in comparison to the concentration of the ion exchanged into the glass-ceramic article for the body (i.e., area not including the surface compression) of the glass-ceramic article.

In some embodiments, the glass-ceramic can have a surface compressive stress in a range from 100 MPa to 500 MPa, 100 MPa to 450 MPa, 100 MPa to 400 MPa, 100 MPa to 350 MPa, 100 MPa to 300 MPa, 100 MPa to 250 MPa, 100 MPa to 200 MPa, 100 MPa to 150 MPa, 150 MPa to 500 MPa, 150 MPa to 450 MPa, 150 MPa to 400 MPa, 150 MPa to 350 MPa, 150 MPa to 300 MPa, 150 MPa to 250 MPa, 150 MPa to 200 MPa, 200 MPa to 500 MPa, 200 MPa to 450 MPa, 200 MPa to 400 MPa, 200 MPa to 350 MPa, 200 MPa to 300 MPa, 200 MPa to 250 MPa, 250 MPa to 500 MPa, 250 MPa to 450 MPa, 250 MPa to 400 MPa, 250 MPa to 350 MPa, 250 MPa to 300 MPa, 300 MPa to 500 MPa, 300 MPa to 450 MPa, 300 MPa to 400 MPa, 300 MPa to 350 MPa, 350 MPa to 500 MPa, 350 MPa to 450 MPa, 350 MPa to 400 MPa, 400 MPa to 500 MPa, 400 MPa to 450 MPa, or 450 MPa to 500 MPa, or any and all sub-ranges formed from any of these endpoints. In some embodiments, the glass-ceramic can have a surface compressive stress of 100 MPa or greater, 150 MPa or greater, 200 MPa or greater, 250 MPa or greater, 300 MPa or greater, 350 MPa or greater, 400 MPa or greater, 450 MPa or greater, or 500 MPa or greater. Compressive stress (including surface compressive stress) is measured with a surface stress meter (FSM) such as commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass-ceramic. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

In one or more embodiments, the processes for making the glass-ceramic includes heat treating the precursor glasses at one or more preselected temperatures for one or more preselected times to induce glass homogenization and crystallization (i.e., nucleation and growth) of one or more crystalline phases (e.g., having one or more compositions, amounts, morphologies, sizes or size distributions, etc.). In some embodiments, the heat treatment can include (i) heating precursor glasses at a rate of 1-10° C./min to a glass pre-nucleation temperature; (ii) maintaining the crystallizable glasses at the pre-nucleation temperature for a time in a range from ¼ hour to 4 hours to produce pre-nucleated crystallizable glasses; (iii) heating the pre-nucleated crystallizable glasses at a rate of 1-10° C./min to a nucleation temperature (Tn); (iv) maintaining the crystallizable glasses at the nucleation temperature for a time in the range from between ¼ hour to 4 hours to produce nucleated crystallizable glasses; (v) heating the nucleated crystallizable glasses at a rate in the range from 1° C./min to 10° C./min to a crystallization temperature (Tc); (vi) maintaining the nucleated crystallizable glasses at the crystallization temperature for a time in a range from ¼ hour to 4 hour to produce the glass-ceramic described herein; and (vii) cooling the formed glass-ceramic to room temperature.

As used herein, the term "crystallization temperature" may be used interchangeably with "ceram temperature" or "ceramming temperature." In addition, the terms "ceram" or "ceramming" in these embodiments, may be used to refer to steps (v), (vi) and optionally (vii), collectively. In some embodiments, the glass pre-nucleation temperature can be 540° C., the nucleation temperature can be 600° C., and the crystallization temperature can be in a range from 630° to 730° C. In other embodiments, the heat treatment does not include maintaining the crystallizable glasses at a glass pre-nucleation temperature. Thus, the heat treatment may include (i) heating the pre-nucleated crystallizable glasses at a rate of 1-10° C./min to a nucleation temperature (Tn); (ii) maintaining the crystallizable glasses at the nucleation temperature for a time in the range from between ¼ hour to 4 hours to produce nucleated crystallizable glasses; (iii) heating the nucleated crystallizable glasses at a rate in the range from 1° C./min to 10° C./min to a crystallization temperature (Tc); (iv) maintaining the nucleated crystallizable glasses at the crystallization temperature for a time in a range from ¼ hour to 4 hours to produce the glass-ceramic described herein; and (v) cooling the formed glass-ceramic to room temperature. The terms "ceram" and "ceramming" in the preceding embodiments may be used to refer to steps (iii), (iv) and optionally (v), collectively. In some embodiments, the nucleation temperature can be 700° C., and the crystal-lization temperature can be 800° C. In some embodiments, the higher the crystallization temperature, the more β-spodumene solid solution is produced as a minor crystalline phase.

Temperature-temporal profiles of heat treatment steps of heating to the crystallization temperature and maintaining the temperature at the crystallization temperature in addition to precursor glass compositions are judiciously prescribed so as to produce one or more of the following desired attributes: crystalline phase(s) of the glass-ceramic, proportions of one or more major crystalline phases and/or one or more minor crystalline phases and residual glass, crystal phase assemblages of one or more predominate crystalline phases and/or one or more minor crystalline phases and residual glass, and grain sizes or grain size distribution among one or more major crystalline phases and/or one or more minor crystalline phases, which in turn may influence the final integrity, quality, color, and/or opacity of the resultant glass-ceramic.

The resultant glass-ceramic can be provided as a sheet, which can then be reformed by pressing, blowing, bending, sagging, vacuum forming, or other means into curved or bent pieces of uniform thickness. Reforming can be done before thermally treating or the forming step can also serve as a thermal treatment step in which both forming and thermal treating are performed substantially simultaneously.

The glass-ceramics and glass-ceramic articles described herein can be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications. In various embodiments, a consumer electronic device (e.g., smartphones, tablet computers, personal computers, ultrabooks, televisions, and cameras), an architectural glass, and/or an automotive glass comprises a glass article as described herein. An exemplary article incorporating any of the glass-ceramic articles disclosed herein may be a consumer electronic device including a housing; electrical components that are at least partially inside or entirely within the housing and including at least a controller, a memory, and a display at or adjacent to the front surface of the housing; and a cover substrate at or over the front surface of the housing such that it is over the display. In some embodiments, at least a portion of at least one of the cover substrate and/or the housing may include any of the glass-ceramic articles disclosed herein.

EXAMPLES

In order that various embodiments be more readily understood, reference is made to the following examples, which are intended to illustrate various embodiments.

Example 1

Example glass and glass-ceramic compositions (in terms of wt %) and properties for achieving colored glass-ceramics are set forth in Table 1. Precursor glasses were formed having the compositions 1-9 listed in Table 1. Precursor glass A in Table 1 did not include a transition metal oxide colorant. The precursor glasses were then subjected to a ceramming cycle having a glass homogenization hold at 540° C. for 4 hours, a nucleation hold at 600° C. for 4 hours, and a crystallization hold at a temperature of 710° C. for 4 hours.

TABLE 1

| Components (wt %) | A | 1 | 2 | 3 | 4 | 5 | 6 | 7 | 8 | 9 |
|---|---|---|---|---|---|---|---|---|---|---|
| $SiO_2$ | 73.6 | 73.46 | 72.88 | 73.39 | 72.88 | 72.88 | 72.21 | 71.88 | 72.88 | 72.88 |
| $Al_2O_3$ | 7.6 | 7.6 | 7.54 | 7.59 | 7.54 | 7.54 | 7.47 | 7.43 | 7.54 | 7.54 |
| $Li_2O$ | 11.8 | 11.16 | 11.07 | 11.15 | 11.07 | 11.07 | 10.97 | 10.92 | 11.07 | 11.07 |
| $Na_2O$ | 1.6 | 1.59 | 1.58 | 1.59 | 1.58 | 1.58 | 1.57 | 1.56 | 1.58 | 1.58 |
| $B_2O_3$ | 0.2 | 0.19 | 0.19 | 0.19 | 0.19 | 0.19 | 0.18 | 0.18 | 0.19 | 0.19 |
| $P_2O_5$ | 1.9 | 2.06 | 2.05 | 2.06 | 2.05 | 2.05 | 2.03 | 2.02 | 2.05 | 2.05 |
| $ZrO_2$ | 3.8 | 3.75 | 3.72 | 3.75 | 3.72 | 3.72 | 3.69 | 3.67 | 3.72 | 3.72 |
| Au | 0 | 0.09 | 0 | 0 | 0 | 0 | 0 | 0 | 0 | 0 |
| $Co_3O_4$ | 0 | 0 | 0.93 | 0 | 0 | 0 | 0 | 0 | 0 | 0 |
| $Cr_2O_3$ | 0 | 0 | 0 | 0.23 | 0 | 0 | 0 | 0 | 0 | 0 |
| CuO | 0 | 0 | 0 | 0 | 0.93 | 0 | 0 | 0 | 0 | 0 |
| $Fe_2O_3$ | 0 | 0 | 0 | 0 | 0 | 0.93 | 1.84 | 2.29 | 0 | 0 |
| NiO | 0 | 0 | 0 | 0 | 0 | 0 | 0 | 0 | 0.93 | 0.93 |
| $V_2O_5$ | 0 | 0 | 0 | 0 | 0 | 0 | 0 | 0 | 0 | 0.93 |
| Appearance of Glass-Ceramic | Clear | Pink | Blue | Light green | Light blue | Light grayish green | Light brownish green | Light brownish green | Light brown | Light grey; transparent |
| Color Coordinates of Glass-Ceramic | | | | | | | | | | |
| L* | 92.9 | 40.5 | 26.1 | 82.5 | 80.6 | 89.4 | 77.4 | 81.6 | 54.3 | 92.9 |
| a* | −2.3 | 32.5 | 24.0 | −13.8 | −17.4 | −3.3 | −4.3 | −4.3 | 9.9 | −2.3 |
| b* | 9.2 | −8.0 | −51.7 | 56.3 | −18.3 | 4.3 | 13.3 | 9.0 | 44.8 | 9.2 |
| Fracture Toughness of Glass-Ceramic | | | | | | | | | | |
| $K_{Ic}$ ($MPa \cdot m^{1/2}$) | 1.11 | 1.11 | 1.11 | 1.11 | 1.11 | 1.11 | 1.11 | 1.11 | 1.11 | 1.11 |

As shown in Table 1, the inclusion of the transition metal oxide colorants is effective to change the color of the glass-ceramics made from precursor glasses 1-9, without altering the phase assemblage of the glass-ceramic or the fracture toughness ($K_{Ic}$). In particular, the phase assemblage of each of the glass-ceramics remained petalite and lithium disilicate. Additionally, each of the example glass-ceramics has a transmittance color coordinate in the CIELAB color space within the following ranges: L*=20 to 90; a*=−20 to 40; and b*=−60 to 60 measured using a PerkinElmer Lambda 950 Spectrometer with illuminant F02 under SCI UVC conditions.

Figure 3:
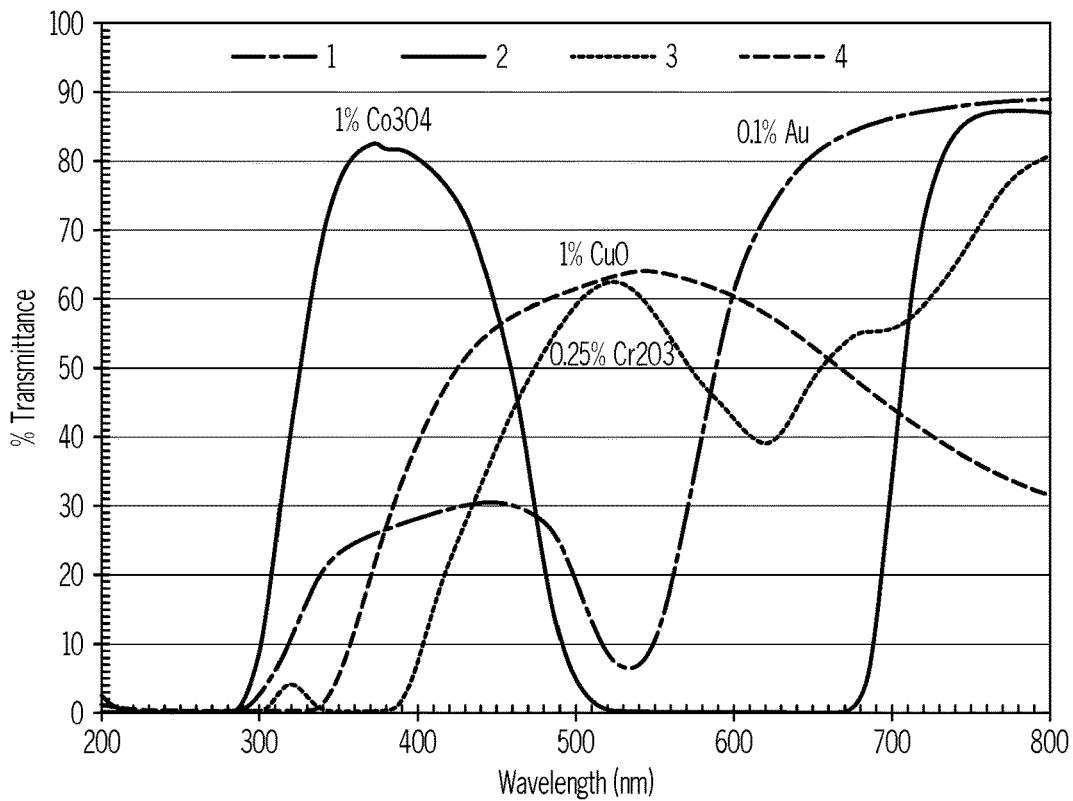
FIG. 3 is a plot of the transmittance of example glass-ceramic compositions 1-4 for wavelengths from 200 nm to 800 nm at a sample thickness of 1 mm.
Figure 4:
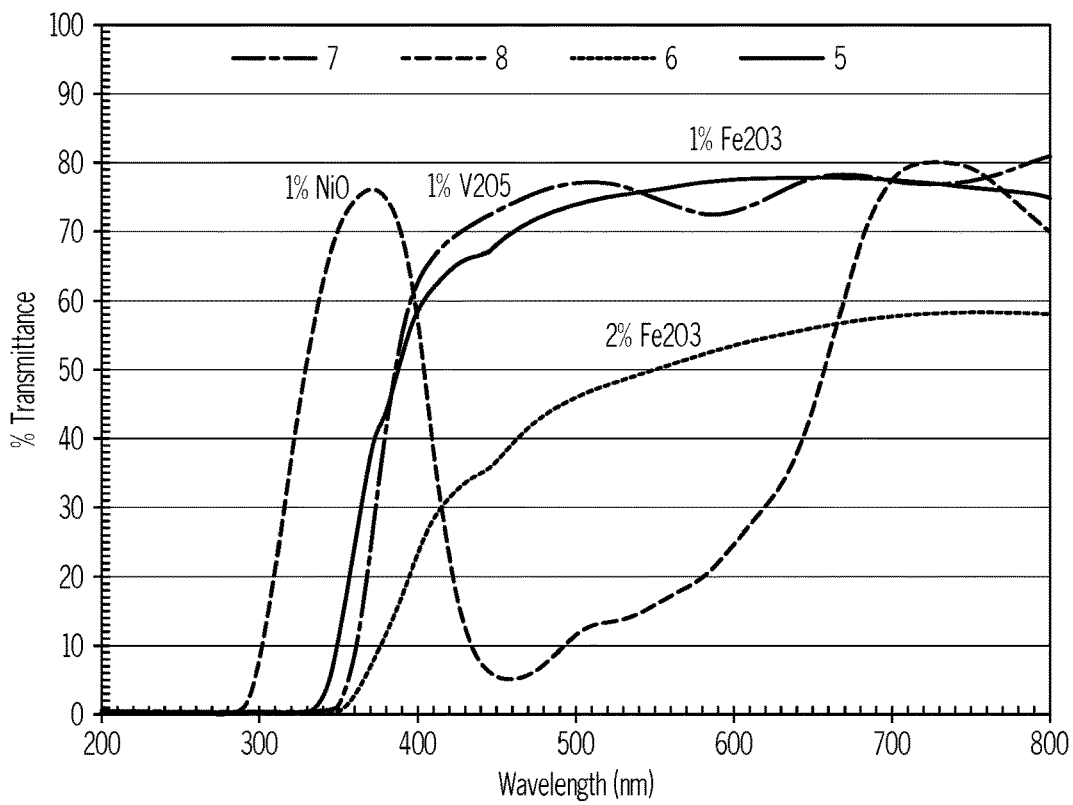
FIG. 4 is a plot of the transmittance of example glass-ceramic compositions 5-8 for wavelengths from 200 nm to 800 nm at a sample thickness of 1 mm.
Figure 5:
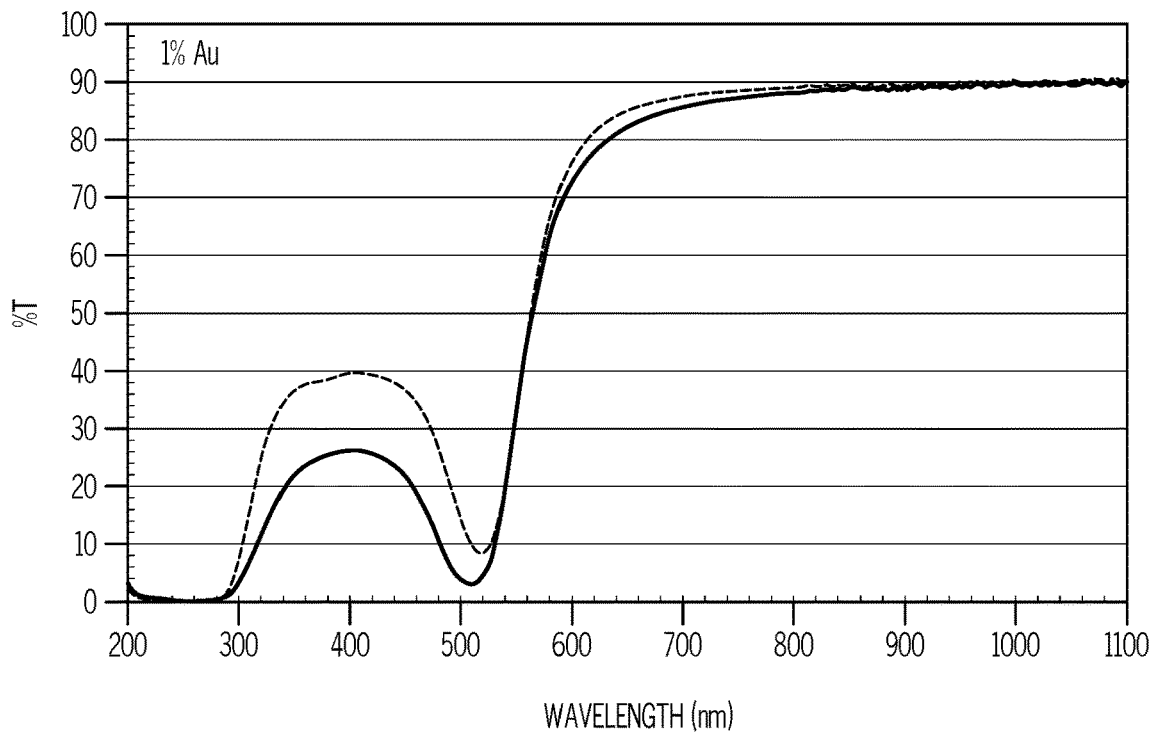
FIG. 5 is a plot of the transmittance of example glass-ceramic (solid line) and precursor glass (dashed line) 9 for wavelengths from 200 nm to 1100 nm at a sample thickness of 1 mm.
Figure 6:
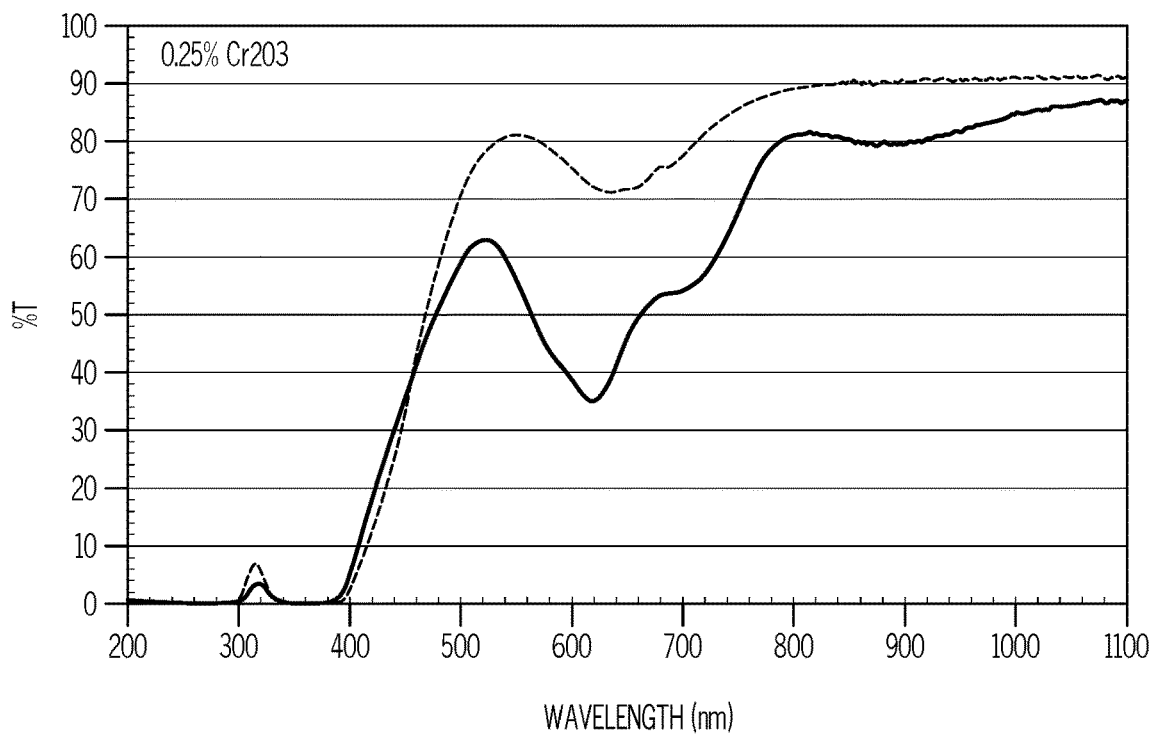
FIG. 6 is a plot of the transmittance of example glass-ceramic (solid line) and precursor glass (dashed line) 10 for wavelengths from 200 nm to 1100 nm at a sample thickness of 1 mm.
Figure 7:
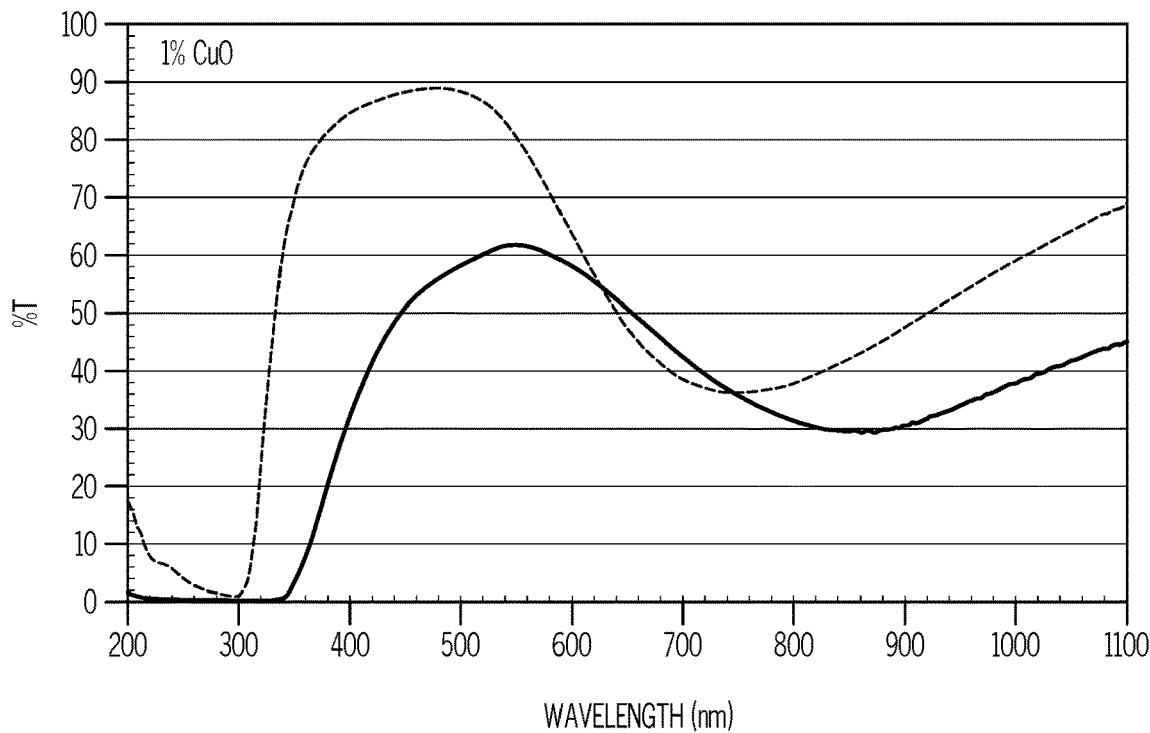
FIG. 7 is a plot of the transmittance of example glass-ceramic (solid line) and precursor glass (dashed line) 11 for wavelengths from 200 nm to 1100 nm at a sample thickness of 1 mm.
Figure 8:
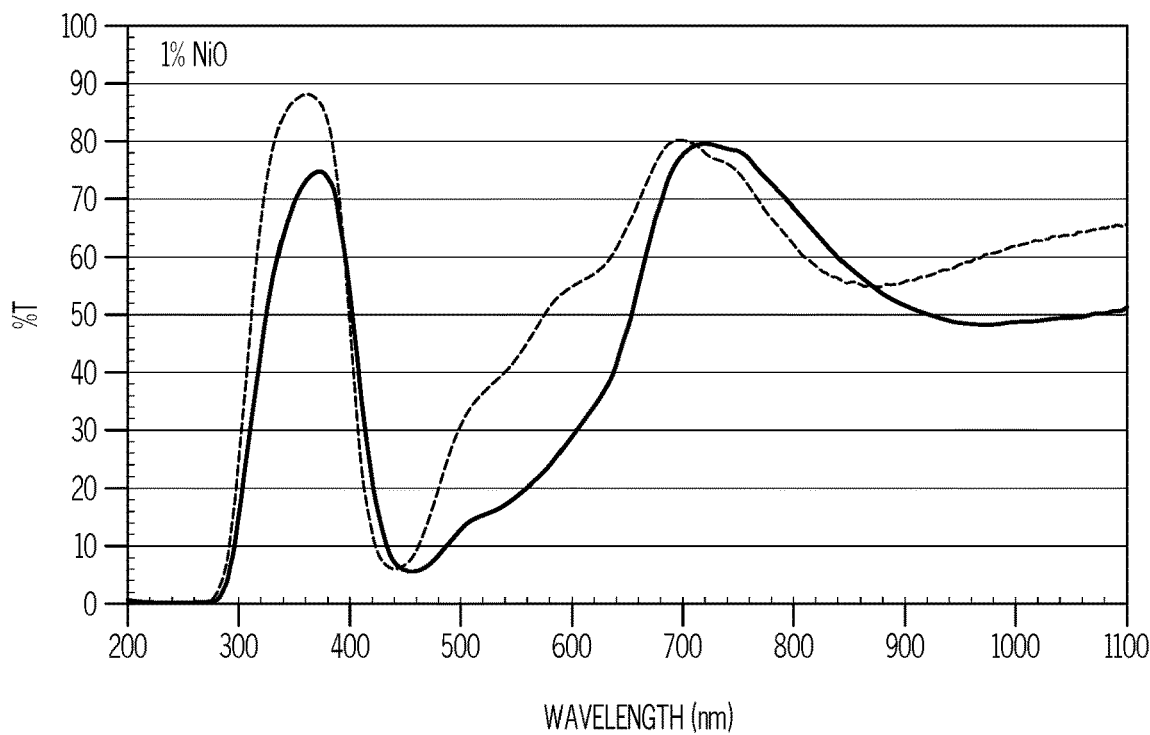
FIG. 8 is a plot of the transmittance of example glass-ceramic (solid line) and precursor glass (dashed line) 12 for wavelengths from 200 nm to 1100 nm at a sample thickness of 1 mm.
Figure 9:
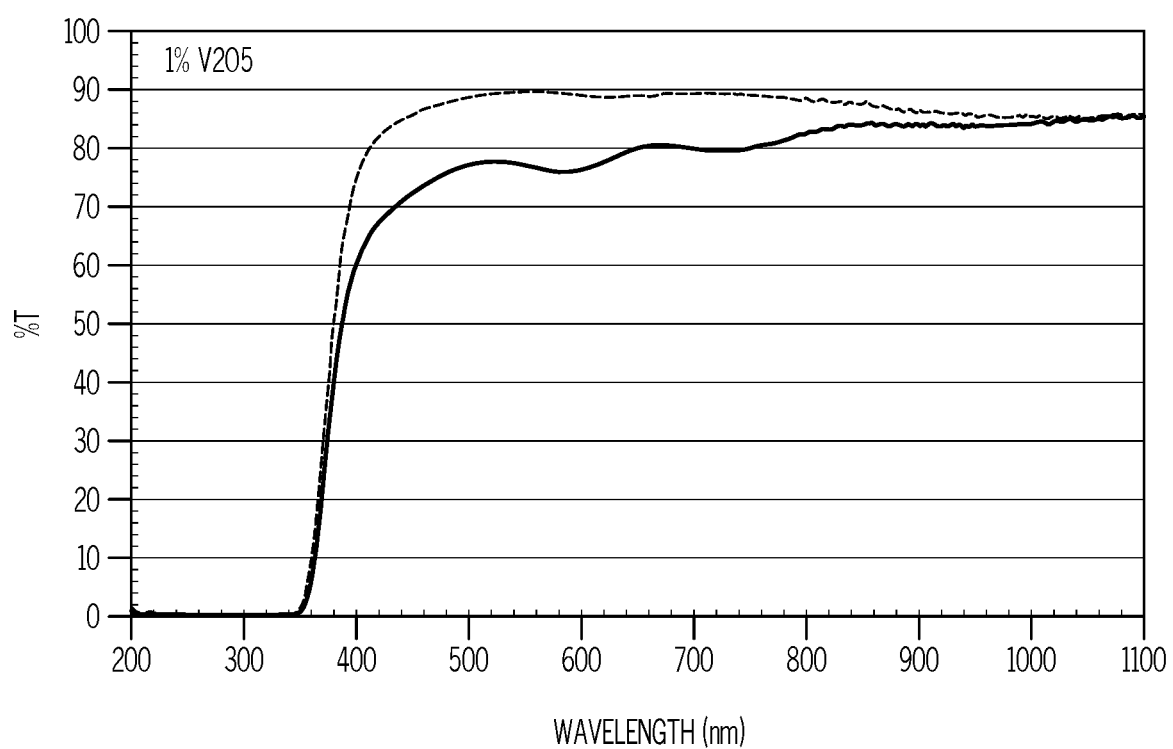
FIG. 9 is a plot of the transmittance of example glass-ceramic (solid line) and precursor glass (dashed line) 13 for wavelengths from 200 nm to 1100 nm at a sample thickness of 1 mm.

The transmittance of glass-ceramics made from precursor glasses 1-9 having a thickness of 1 mm was measured for light having a wavelength from 200 nm to 800 nm. As shown in FIGS. 3 and 4, the average transmittance of each of the example glass-ceramics was less than 90%.

Example 2

Example glass and glass-ceramic compositions (in terms of wt %) and properties for achieving colored glass-ceramics are set forth in Table 1. Precursor glasses were formed having the compositions 10-14 listed in Table 2. The precursor glasses were then subjected to a ceramming cycle having a nucleation hold at 560° C. for 4 hours, and a crystallization hold at a temperature of 760° C. for 1 hour. Transmittance color coordinates for the precursor glass as well as the resultant glass-ceramic are also reported in Table 2.

TABLE 2

| Components (wt %) | 10 | 11 | 12 | 13 | 14 |
|---|---|---|---|---|---|
| $SiO_2$ | 73.4 | 73.4 | 72.9 | 72.9 | 72.9 |
| $Al_2O_3$ | 7.6 | 7.6 | 7.5 | 7.5 | 7.5 |
| $Li_2O$ | 11.2 | 11.1 | 11.1 | 11.1 | 11.1 |
| $Na_2O$ | 1.6 | 1.6 | 1.6 | 1.6 | 1.6 |
| $B_2O_3$ | 0.2 | 0.2 | 0.2 | 0.2 | 0.2 |
| $P_2O_5$ | 2.1 | 2.1 | 2.0 | 2.0 | 2.0 |
| $ZrO_2$ | 3.8 | 0 | 0 | 0 | 0 |
| Au | 0.1 | 0 | 0 | 0 | 0 |
| $Cr_2O_3$ | 0 | 0.2 | 0 | 0 | 0 |
| CuO | 0 | 0 | 0.9 | 0 | 0 |
| NiO | 0 | 0 | 0 | 0.9 | 0 |
| $V_2O_5$ | 0 | 0 | 0 | 0 | 0.9 |
| Color Coordinates of Precursor Glass | | | | | |
| L* | 75.4 | 90.2 | 89.4 | 73.3 | 95.8 |
| a* | 30.5 | −10.2 | 319.1 | 3.4 | −0.9 |
| b* | 16.5 | 44.5 | −10.1 | 59.6 | 2.8 |
| Color Coordinates of Glass-Ceramic | | | | | |
| L* | 73.3 | 75.5 | 81.7 | 53.8 | 90.3 |
| a* | 29.8 | −17.9 | −4.3 | 11.7 | −1.2 |
| b* | 35.9 | 17.4 | 9.7 | 29.1 | 4.0 |

The transmittance of glass-ceramics made from precursor glasses 1-9 having a thickness of 1 mm was measured for light having a wavelength from 200 nm to 800 nm. As shown in FIGS. 3 and 4, the transmittance of each of the example glass-ceramics was less than 90% for points from 400 nm to 800 nm.

The transmittance of glass-ceramics (solid lines) and corresponding precursor glasses (dashed lines) 10-14 having a thickness of 1 mm was measured for light having a wavelength from 200 nm to 1100 nm. As shown in FIGS. 5-9, the transmittance of each of the example glass-ceramics was less than 90% for points from 400 nm to 1100 nm. Without wishing to be bound by theory, it is believe that the data depicted in FIGS. 5-9 illustrates that the transmittance of the glass-ceramics may be tuned based on the ceramming conditions employed. Specifically, it is believed that ceramming the glass for longer periods of time (thereby creating a greater percentage of the ceramic phase(s) in the glass ceramic) may decrease the transmittance of the glass-ceramics. As such, controlling the ceramming conditions may be used to tune the transmittance of the glass-ceramics.

Accordingly, various embodiments described herein provide colored glass-ceramics having high strength and fracture toughness. In particular, various embodiments include one or more colorants in the form of transition metal oxides which impart color to the glass-ceramic without altering the phase assemblage of the glass-ceramic or adversely impacting the strength and/or fracture toughness of the glass-ceramic.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass-ceramic article comprising:
   a petalite crystalline phase;
   a lithium silicate crystalline phase; and
   >0.5 wt % to 5 wt % of one or more colorants selected from the group consisting of $Fe_2O_3$, NiO, $Co_3O_4$, $MnO_2$, $Cr_2O_3$, Au, and $V_2O_5$,
   wherein a weight percentage of each of the petalite crystalline phase and the lithium silicate crystalline phase in the glass-ceramic article are greater than each of the weight percentages of other crystalline phases present in the glass-ceramic article;
   wherein an average transmittance of the glass-ceramic article is in a range from 20% to less than 90% over the wavelength range of 400 nm to 1000 nm for a glass-ceramic article thickness of 1 mm; and
   wherein the glass-ceramic article has a transmittance color coordinate in CIELAB color space of:
      L*=from 20 to 90;
      a*=from −20 to 40; and
      b*=from −60 to 60
   for a CIE illuminant F02 under SCI UVC conditions.

2. The glass-ceramic article according to claim 1, wherein the glass-ceramic article has a composition comprising, in wt %:
   $SiO_2$ in an amount of from 55 to 80;
   $Al_2O_3$ in an amount of from 2 to 20;
   $Li_2O$ in an amount of from 5 to 20;
   $P_2O_5$ in an amount of from 0.5 to 6; and
   $ZrO_2$ in an amount of from 0.2 to 15.

3. The glass-ceramic article according to claim 1, comprising >0.5 to 3 wt % of the one or more colorants.

4. The glass-ceramic article according to claim 1, wherein at least 80 wt % of the one or more colorants is present in a residual glass phase of the glass-ceramic article.

5. The glass-ceramic article according to claim 1, wherein at least 95 wt % of the one or more colorants is present in a residual glass phase of the glass-ceramic article.

6. The glass-ceramic article according to claim 2, wherein the one or more colorants is selected from the group consisting of, in wt %:
   Au in an amount of from 0.1 to 1.5;
   $Cr_2O_3$ in an amount of from 0.05 to 1.0;
   NiO in an amount of from 0.1 to 2.0;
   $V_2O_5$ in an amount of from 0.1 to 2.0;
   $Co_3O_4$ in an amount of from 0.01 to 2.0; and
   combinations thereof.

7. The glass-ceramic article according to claim 6, wherein the glass-ceramic article has a transmittance color coordinate in the CIELAB color space of:
   L*=from 50 to 90;
   a*=from −20 to 30; and
   b*=from 0 to 40
for a CIE illuminant F02 under SCI UVC conditions.

8. A glass-ceramic article comprising:
   a petalite crystalline phase;
   a lithium silicate crystalline phase; and
   a residual glass phase comprising >0.5 wt % to 5 wt % of one or more colorants selected from the group consisting of $Fe_2O_3$, NiO, $Co_3O_4$, $MnO_2$, $Cr_2O_3$, Au, and $V_2O_5$,
   wherein:
      the glass-ceramic article has a fracture toughness of 1 $MPa \cdot m^{1/2}$ or greater;
      an average transmittance of the glass-ceramic article is in a range from 20% to less than 90% over the wavelength range of 400 nm to 1000 nm for a glass-ceramic article thickness of 1 mm; and
      the glass-ceramic article has a transmittance color coordinate in CIELAB color space of:
         L*=from 20 to 90;
         a*=from −20 to 40; and
         b*=from −60 to 60
   for a CIE illuminant F02 under SCI UVC conditions.

9. The glass-ceramic article according to claim 8, wherein the glass-ceramic article has a composition comprising, in wt %:
   $SiO_2$ in an amount of from 55 to 80;
   $Al_2O_3$ in an amount of from 2 to 20;
   $Li_2O$ in an amount of from 5 to 20;
   $P_2O_5$ in an amount of from 0.5 to 6; and
   $ZrO_2$ in an amount of from 0.2 to 15.

10. The glass-ceramic article according to claim 8, comprising >0.5 to 3 wt % of the one or more colorants.

11. The glass-ceramic article according to claim 8, wherein at least 80 wt % of the one or more colorants is present in the residual glass phase of the glass-ceramic article.

12. The glass-ceramic article according to claim 8, wherein at least 95 wt % of the one or more colorants is present in the residual glass phase of the glass-ceramic article.

13. The glass-ceramic article according to claim 9, wherein the one or more colorants is selected from the group consisting of, in wt %:
   Au in an amount of from 0.1 to 1.5;
   $Cr_2O_3$ in an amount of from 0.05 to 1.0;
   NiO in an amount of from 0.1 to 2.0;
   $V_2O_5$ in an amount of from 0.1 to 2.0;
   $Co_3O_4$ in an amount of from 0.01 to 2.0; and
   combinations thereof.

14. The glass-ceramic article according to claim 13, wherein the glass-ceramic article has a transmittance color coordinate in the CIELAB color space of:
   L*=from 50 to 90;
   a*=from −20 to 30; and
   b*=from 0 to 40
for a CIE illuminant F02 under SCI UVC conditions.

15. The glass-ceramic article according to claim 8, wherein each of the petalite crystalline phase and the lithium silicate crystalline phase in the glass-ceramic article have greater weight percentages than other crystalline phases present in the glass-ceramic article.

16. A glass-ceramic article comprising:

a petalite crystalline phase; and a lithium silicate crystalline phase, wherein:

- each of the petalite crystalline phase and the lithium silicate crystalline phase in the glass-ceramic article have greater weight percentages than other crystalline phases present in the glass-ceramic article;
- the glass-ceramic article comprises >0.5 wt % to 5 wt % of one or more colorants selected from the group consisting of $Fe_2O_3$, NiO, $Co_3O_4$, $MnO_2$, $Cr_2O_3$, Au, and $V_2O_5$;
- an average transmittance of the glass-ceramic article is in a range from 20% to less than 90% over the wavelength range of 400 nm to 1000 nm for a glass-ceramic article thickness of 1 mm; and
- the glass-ceramic article has a transmittance color coordinate in CIELAB color space of:
    - $L^*$=from 50 to 90;
    - $a^*$=from −20 to 30; and
    - $b^*$=from 0 to 40 for a CIE illuminant F02 under SCI UVC conditions.

17. The glass-ceramic article according to claim 16 further comprising, in wt %:
    - $SiO_2$ in an amount of from 55 to 80;
    - $Al_2O_3$ in an amount of from 2 to 20;
    - $Li_2O$ in an amount of from 5 to 20;
    - $P_2O_5$ in an amount of from 0.5 to 6; and
    - $ZrO_2$ in an amount of from 0.2 to 15.

18. The glass-ceramic article according to claim 16, wherein the glass-ceramic article has a fracture toughness of 1 $MPa \cdot m^{1/2}$ or greater.

19. The glass-ceramic article according to claim 16, wherein the glass-ceramic article has a Vickers hardness of 600 $kgf/mm^2$ or greater.

20. The glass-ceramic article according to claim 16, wherein the glass-ceramic article has a ring-on-ring strength of at least 300 MPa.

* * * * *